I. N. HARRIS & W. H. BOWNE.
RIDING HARROWS.

No. 179,915. Patented July 18, 1876.

WITNESSES:
H. Prydquist.
John Goerthals

INVENTOR:
I. N. Harris
W. H. Bowne
BY
ATTORNEYS.

UNITED STATES PATENT OFFICE.

ISAAC N. HARRIS AND WILLIAM H. BOWNE, OF PAVILION, ILLINOIS.

IMPROVEMENT IN RIDING-HARROWS.

Specification forming part of Letters Patent No. 179,915, dated July 18, 1876; application filed May 16, 1876.

*To all whom it may concern:*

Figure 1:
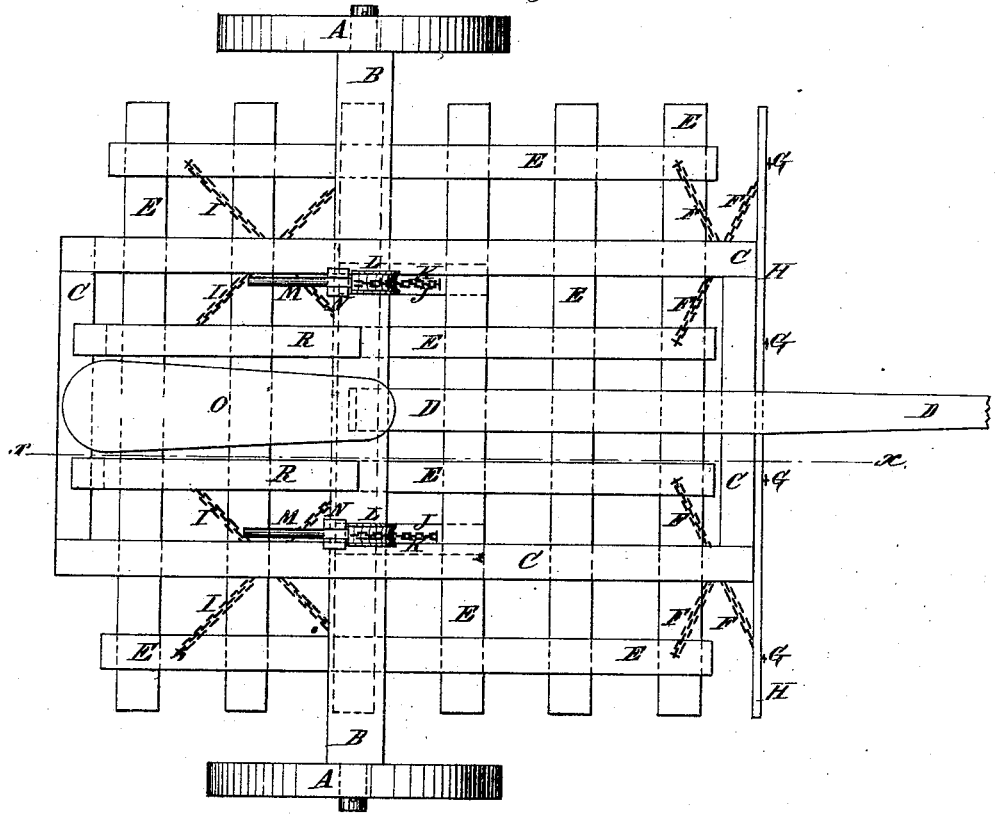
Figure 2:
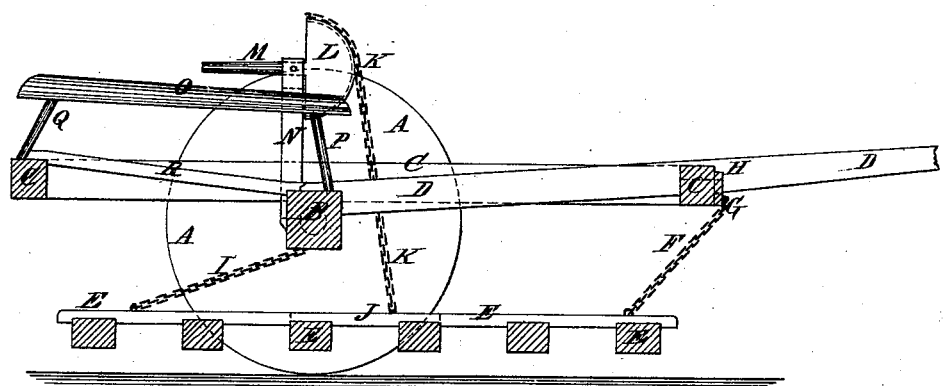

Be it known that we, ISAAC NORTON HARRIS and WM. HENRY BOWNE, of Pavilion, Kendall county, and State of Illinois, have invented a new and Improved Riding-Harrow, of which the following is a specification:

In the accompanying drawing, Figure 1 is a top view of our improved machine, and Fig. 2 is a vertical section of the same, taken through the line X X, Fig. 1.

The object of this invention is to furnish an improved riding-harrow, simple in construction, effective in operation, convenient in use, easily guided and controlled, and of light draft.

In the annexed drawing, A represents the wheels, which revolve upon the journals of the axle B. The axle B is made long, so that the harrow-frame may be received between the wheels A. To the middle part of the axle B is attached the frame C, which consists of two side bars, connected at their ends by two end bars. D is the tongue, to which the draft is applied, by which the harrow is guided, and which is attached to the axle B and to the front cross-bar of the frame C. The harrow-frame E is made in two parts, halves, or sections, each section consisting of six, more or less, parallel cross-bars, to which the teeth are attached, and to which, near the ends of their upper sides, are attached two longitudinal bars. To the forward end of the longitudinal bars of each part of the frame E are attached the lower ends of two chains, F, which cross each other, and are hooked upon hooks G attached to the middle and outer parts of the long cross-bar H attached to the front bar of the frame C. To the rear ends of the longitudinal bars of each part of the frame E are attached the lower ends of two chains, I, the upper ends of which are attached to the middle and outer parts of the axle B.

By this arrangement of the draft-chains F I the parts of the harrow-frame are free to adjust themselves to the surface of the ground, however uneven it may be, and at the same time will be kept in their proper relative positions. By adjusting the length of the chains the harrow-frame may be drawn level, or with its forward end slightly raised, as may be desired. To short bars J attached to the middle parts of the frame E are attached the lower ends of two chains, K, at points a little in front of the centers of gravity of said parts, so that the forward ends of said parts may be raised a little in advance of their rear ends. The upper ends of the chains K pass around and are attached to eccentric wheels or segments L attached to the forward ends of the levers M. The levers M are pivoted to the upper ends of two posts, N, the lower ends of which are attached to the axle B. The rear ends of the levers M project into such a position that they may be easily reached and operated by the driver from his seat, to raise the parts of the harrow-frame E away from the ground, to clear the harrow of rubbish, to pass obstructions, &c.

O is the driver's seat, which is made long, and its forward standards P are attached to the axle B, and its rear standards Q are attached to the rear cross-bar of the frame C. The driver's feet rest upon the foot-boards R, the forward ends of which are attached to the axle B, and their rear ends are attached to the rear cross-bar of the frame C. The seat O is made long, so that the driver, by adjusting his position upon the said seat O, can balance the machine, as may be desired.

Having thus described our invention, what we claim as new, and desire to secure by Letters Patent, is—

An improved riding-harrow, formed of the wheels A, long axle B, frame C, harrow-frame E, chains F I, and cross-bar H, constructed and combined with each other substantially as herein shown and described.

ISAAC N. HARRIS.
WILLIAM HENRY BOWNE.

Witnesses:
THOMAS RIPLEY,
WM. L. HARRIS.